United States Patent
Lee et al.

(10) Patent No.: US 8,069,342 B2
(45) Date of Patent: Nov. 29, 2011

(54) COMPUTER HAVING A BIOS CLEAR BUTTON WHICH IS CAPABLE OF AVOIDING MISTOUCH

(75) Inventors: Yu-Chen Lee, Taipei (TW); Chieh-Shien Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 852 days.

(21) Appl. No.: 12/113,954

(22) Filed: May 2, 2008

(65) Prior Publication Data
US 2008/0215876 A1    Sep. 4, 2008

(30) Foreign Application Priority Data
May 11, 2007 (TW) .............................. 96116837 A

(51) Int. Cl.
G06F 9/00 (2006.01)
G06F 15/177 (2006.01)
G06F 1/24 (2006.01)

(52) U.S. Cl. .................. 713/1; 713/2; 713/100

(58) Field of Classification Search .................. 713/100, 713/1, 2
See application file for complete search history.

(56) References Cited

U.S. PATENT DOCUMENTS

| | | | |
|---|---|---|---|
| 6,253,319 B1 * | 6/2001 | Tran et al. | 713/1 |
| 6,647,512 B1 | 11/2003 | James et al. | |
| 7,003,655 B2 * | 2/2006 | Wang et al. | 713/1 |
| 7,069,472 B2 * | 6/2006 | James et al. | 714/36 |
| 2003/0236928 A1 * | 12/2003 | Wang et al. | 710/8 |
| 2004/0073842 A1 | 4/2004 | James et al. | |
| 2007/0208891 A1 * | 9/2007 | Liu | 710/62 |
| 2008/0294886 A1 * | 11/2008 | Chang | 713/2 |

FOREIGN PATENT DOCUMENTS
CN    2105095    5/1992

OTHER PUBLICATIONS
KingCody, Front Panel CMOS reset switch, Jan. 20, 2007, TechSpot OpenBoards, pp. 5.*
DuronClocker, External clear CMOS button, Apr. 2, 2002, HardwareCentralForums, pp. 4.*

* cited by examiner

*Primary Examiner* — Suresh Suryawanshi
(74) *Attorney, Agent, or Firm* — Jianq Chyun IP Office

(57) ABSTRACT

A computer and a BIOS clear button thereof are provided. The BIOS clear button is adapted to be electrically connected with a motherboard of the computer. The BIOS clear button includes a body, a key, and a connecting part. The body has a recessed portion and a plurality of protrusion portions disposed beside the recessed portion, wherein the protrusion portions protrude from the recessed portion. The key is disposed on the recessed portion, and the connecting part is connected to the body and is electrically connected with the motherboard.

11 Claims, 2 Drawing Sheets

COMPUTER HAVING A BIOS CLEAR BUTTON WHICH IS CAPABLE OF AVOIDING MISTOUCH

CROSS-REFERENCE TO RELATED APPLICATION

This application claims the priority benefit of Taiwan application serial no. 96116837, filed on May 11, 2007. The entirety of the above-mentioned patent application is hereby incorporated by reference herein and made a part of specification.

BACKGROUND OF THE INVENTION

1. Field of the Invention

The invention relates to a BIOS clear button and, more particularly, to a computer and a BIOS clear button thereof.

2. Description of the Related Art

As the popularization of assembling computers by oneself, users usually improve the a computer performance by the overclocking technology. Normally, a basic input/output system (BIOS) of the computer can be set to control the operating frequency of the CPU of the computer. Generally speaking, the BIOS of the computer is set only when the computer is in a normal working state. The improper setting of the BIOS not only results in crash of the computer host, but also makes the computer host fail to boot after it is shut down. If the computer host fails to boot, the users cannot restore the BIOS by setting the BIOS.

The improper setting of the BIOS results in crash of the computer. Further, as the crash time increases, internal components of the computer may be seriously damaged. Conventionally, the users should press the power button of the computer for four seconds first to shut down the computer. Then the housing of the computer can be opened. Next a jumper is electrically connected to specific pins in a front panel of the motherboard to clear (or reset) basic setting of the BIOS. However, steps of clearing the basic setting of the BIOS are very troublesome, and the jumper is too small to be lost.

Therefore, in another conventional method, the jumper is replaced with a slide switch which is provided at an input/output area of the motherboard. Thus the users can clear the basic setting of the BIOS by the slide switch without opening the housing of the computer host. However, the slide switch exposed out of the housing may easily be touched by mistake. For example, if the computer host has entered an operating system which is in a normal state, when the users connect an earphone plug to an audio output jack of the input/output area, the slide switch for clearing the basic setting of the BIOS may be touched by mistake. Thus the operating system may produce unpredictable errors.

BRIEF SUMMARY OF THE INVENTION

The invention provides a BIOS clear button which is capable of avoiding mistouch.

The invention provides a computer having a BIOS clear button which is capable of avoiding mistouch.

The invention provides a BIOS clear button which is adapted to be electrically connected with a motherboard of a computer. The BIOS clear button includes a body, a key, and a connecting part. The body has a recessed portion and a plurality of protrusion portions disposed beside the recessed portion, wherein the protrusion portions protrude from the recessed portion. The key is disposed on the recessed portion, and the connecting part is connected to the body and is electrically connected with the motherboard.

In one embodiment, the height of the body is greater than that of the connecting part.

In one embodiment, the BIOS clear button is provided at an input/output area of the motherboard.

Further, the invention provides a computer including a host, a motherboard and a BIOS clear button. The host has a housing which has a hole. The motherboard is provided in the housing, and the BIOS clear button is disposed at the housing. The BIOS clear button includes a body, a key, and a connecting part. The body is disposed in the hole and protrudes from the housing. The body has a recessed portion and a plurality of protrusion portions disposed beside the recessed portion, wherein the protrusion portions protrude from the recessed portion. The key is disposed on the recessed portion, and the connecting part is connected to the body and is electrically connected with the motherboard.

In one embodiment, the height of the body is greater than that of the connecting part.

In one embodiment, the hole exposes an input/output area of the motherboard.

In one embodiment, the connecting part is provided at the input/output area of the motherboard and is electrically connected with the motherboard.

In the BIOS clear button and the computer thereof according to the invention, users can conveniently clear setting by the BIOS clear button. Further, the key of the BIOS clear button is provided at the recessed portion, and the protrusion portions disposed beside the recessed portion can prevent the users or other people from touching the key by mistake. Therefore, the condition that the basic setting of the BIOS is immediately cleared because of mistouch when the system is smoothly running is avoided.

As described above, the BIOS clear button according to the invention can avoid being touched by mistake by the users or other people. Therefore, the condition that the computer with the BIOS clear button is shut down abnormally because of mistouch in the operation of the system is avoided, and then the basic setting of the BIOS does not need to be reset. Thus the running of the computer can be maintained, and the internal electronic components of the computer can be protected to prolong service life thereof.

Further, the users can easily identify the BIOS clear button by a light source and the material of the key. To the users, the BIOS clear button can be conveniently used and also can be easily identified.

These and other features, aspects, and advantages of the present invention will become better understood with regard to the following description, appended claims, and accompanying drawings.

DETAILED DESCRIPTION OF THE EMBODIMENTS

Figure 1:
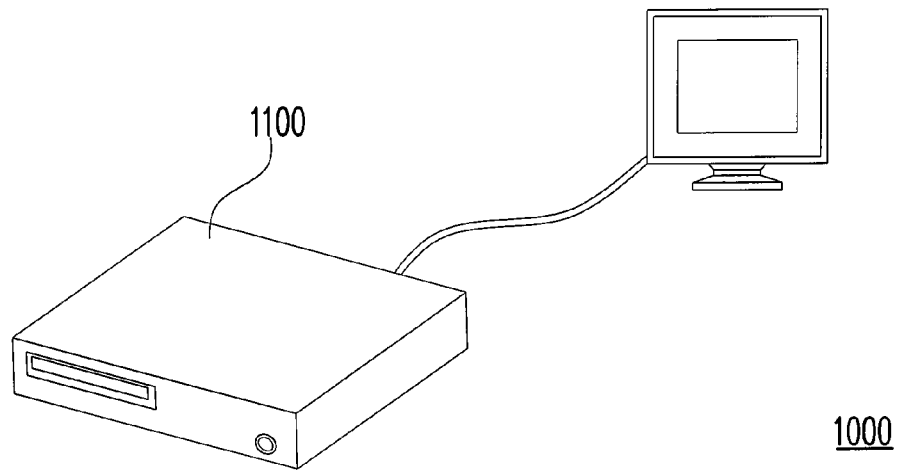
FIG. 1 is a schematic diagram showing a computer according to an embodiment of the invention.
Figure 2:
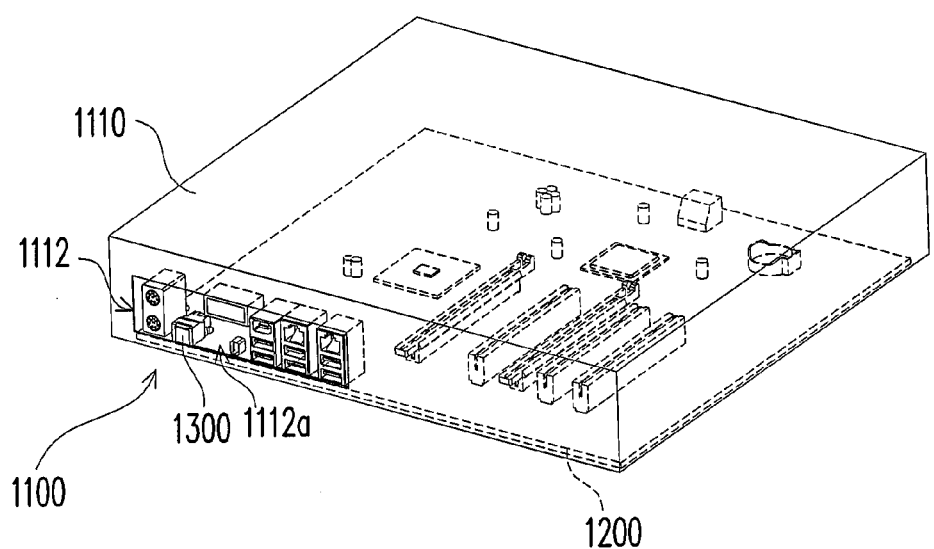
FIG. 2 is a schematic diagram showing a host, a motherboard, and a BIOS clear button according to an embodiment of the invention.

FIG. 1 is a schematic diagram showing a computer according to an embodiment of the invention, and FIG. 2 is a schematic diagram showing a host, a motherboard, and a BIOS clear button. Please refer to FIG. 1 and FIG. 2 together. A computer 1000, which may be a desktop personal computer or a notebook, includes a host 1100, a motherboard 1200 and a BIOS clear button 1300. The host 1100 has a housing 1110 which has a hole 1112. The motherboard 1200 is provided in the housing 1110, and the hole 1112 exposes an input/output area 1112a of the motherboard 1200. The input/output area 1112a is used to be connected with a keyboard, a mouse, a portable drive, a MP3 storage, a network cable, a power wire, an earphone and so on.

Figure 3:
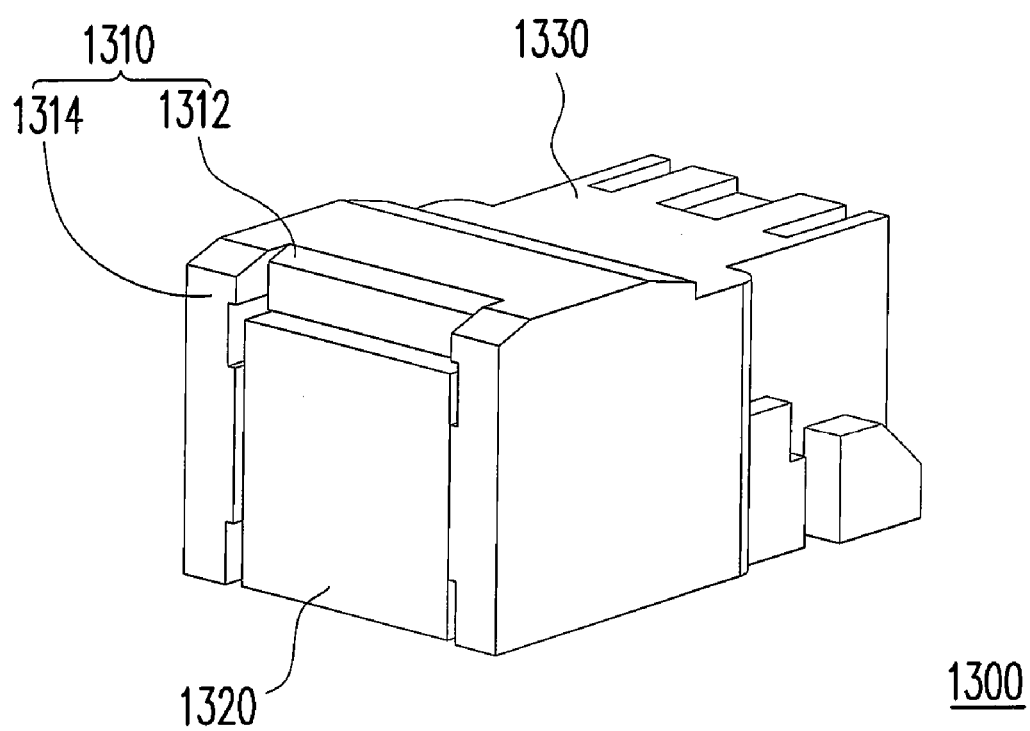
FIG. 3 is a schematic diagram showing a BIOS clear button according to an embodiment of the invention.

FIG. 3 is a schematic diagram showing a BIOS clear button. Please refer to FIG. 2 and FIG. 3 together. The BIOS clear button 1300 is disposed at the housing 1110 and is electrically connected with the motherboard 1200. In detail, the BIOS clear button includes a body 1310, a key 1320, and a connecting part 1330. The body 1310 is disposed in the hole 1112 and protrudes from the housing 1110. The body 1310 has a recessed portion 1312 and a plurality of protrusion portions 1314 disposed beside the recessed portion 1312, and the protrusion portions 1314 protrude from the recessed portion 1312. The key 1320 is sleeved on the recessed portion 1312, and a surface 1322 of the key 1320 is more depressed than the protrusion portions 1314. The connecting part 1330 is connected to the body 1310 and is electrically connected with the motherboard 1200. In this embodiment, the connecting part 1330 can be directly inserted in the motherboard 1200 to be electrically connected therewith. Further, the connecting part 1330 can be integrally formed with the body 1310.

Especially, to improve the production quality and the jointing, the height of the body 1310 protruding from the housing 1110 is greater than that of the connecting part 1330 disposed in the housing 1110. Preferably, the height of the connecting part 1330 is one millimeter less than that of the body 1310, and then the connecting part 1330 can be slightly underlaid when the connecting part 1330 is inserted in the input/output area of the motherboard 1200 to allow the body 1310 to be exactly fastened in the hole 1112 of the housing 1110.

Please refer to FIG. 1, FIG. 2, and FIG. 3. When the computer 1000 fails to be booted normally because of overclocking crash, users can immediately shut down the computer 1000 and reset the basic setting of the BIOS by pressing the key 1320 of the BIOS clear button 1300.

To make the users easily identify the BIOS clear button 1300, the key 1320 can be made of light-permeable material. Further, a light source which may be a light bulb also can be provided in the BIOS clear button, and the light of the light source can penetrate from the key 1320. Thus the users can easily identify the BIOS clear button 1300.

When the users or other people touch the input/output area 1112a of the motherboard 1200 by mistake, they do not touch the key 1320 directly because of the protection of the protrusion portion 1314. Therefore, when the users operate the computer 1000, it does not happen that the computer 1000 is shut down abnormally because of mis-touch, and the basic setting of the BIOS does not need to be reset. Thus, the computer can be shut down normally after procedures are finished, and the internal electronic components of the computer 1000 can be protected to prolong service life thereof.

Further, the moving journey of the key 1320 can be lengthened to avoid the situation that the computer 1000 is shut down and the setting of the BIOS should be reset when the users or other people just slightly touch the BIOS clear button 1300 by mistake. Further, a positioning mechanism (not shown) can be disposed in the connecting part 1330 or in the body 1310. Then, when the key 1320 contacts the positioning mechanism, mechanism interference happens and sounds are made. Then the users can know that the BIOS clear button 1300 reaches a positioning location. Further, the computer 1000 is to be shut down and the BIOS setting is to be reset.

As described above, the BIOS clear button according to the invention can avoid being touched by mistake by the users or other people. Therefore the condition that the computer with the BIOS clear button is shut down abnormally because of mis-touch in the operation of the system is avoided, and then the basic setting of the BIOS does not need to be reset. Thus the running of the computer can be maintained, and the internal electronic components of the computer can be protected to prolong service life thereof.

Further, the users can easily identify the BIOS clear button by the light source and the material of the key. To the users, the BIOS clear button can be conveniently used and also can be easily identified.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A BIOS clear button, electrically connected with a motherboard of a computer, the BIOS clear button comprising:
   a body having a recessed portion and a plurality of protrusion portions disposed beside the recessed portion, wherein the protrusion portions protrude from the recessed portion;
   a key disposed on the recessed portion; and
   a connecting part connected to the body and electrically connected with the motherboard of the computer.

2. The BIOS clear button according to claim 1, wherein the height of the body is greater than that of the connecting part.

3. The BIOS clear button according to claim 1, wherein the BIOS clear button is disposed on an input/output area of the motherboard.

4. A computer comprising:
   a host having a housing which has a hole;
   a motherboard provided in the housing; and
   a BIOS clear button disposed at the housing, the BIOS clear button comprising:
      a body disposed in the hole and protruding from the housing, the body having a recessed portion and a plurality of protrusion portions disposed beside the recessed portion, wherein the protrusion portions protrude from the recessed portion;
      a key disposed on the recessed portion; and
      a connecting part connected to the body and electrically connected with the motherboard.

5. The computer according to claim 4, wherein the height of the body is greater than that of the connecting part.

6. The computer according to claim 4, wherein the hole exposes an input/output area of the motherboard.

7. The computer according to claim 6, wherein the connecting part is provided at the input/output area of the motherboard and is electrically connected with the motherboard.

8. The BIOS clear button according to claim 1, wherein a moving journey of the key disposed on the recessed portion is configured to a length for performing a BIOS clear operation.

9. The BIOS clear button according to claim 1, further comprising a positioning mechanism is disposed in the connection part or in the body for generating a sound when the key is pressed to a positioning location for performing a BIOS clear operation.

10. The computer according to claim 4, wherein a moving journey of the key disposed on the recessed portion is configured to a length for performing a BIOS clear operation.

11. The computer according to claim 4, further comprising a positioning mechanism is disposed in the connection part or in the body for generating a sound when the key is pressed to a positioning location for performing a BIOS clear operation.

* * * * *